United States Patent
Jung et al.

(10) Patent No.: US 7,051,047 B2
(45) Date of Patent: May 23, 2006

(54) METHOD OF COMBINING MULTIMEDIA FILES

(75) Inventors: June Kee Jung, Seoul (KR); Gi Hoon Keum, Seoul (KR); Seung Hong Kim, Seoul (KR); Ji Hoon Lee, Seoul (KR); Jung Sam Kim, Seoul (KR)

(73) Assignee: Wizmax, Co., Ltd., Seoul (KR)

( * ) Notice: Subject to any disclaimer, the term of this patent is extended or adjusted under 35 U.S.C. 154(b) by 148 days.

(21) Appl. No.: 10/181,114

(22) PCT Filed: Jan. 10, 2001

(86) PCT No.: PCT/KR01/00027

§ 371 (c)(1),
(2), (4) Date: Nov. 12, 2002

(87) PCT Pub. No.: WO01/67277

PCT Pub. Date: Sep. 13, 2001

(65) Prior Publication Data

US 2003/0120602 A1    Jun. 26, 2003

(30) Foreign Application Priority Data

Jan. 12, 2000    (KR) ................................. 2000-1392

(51) Int. Cl.
*G06F 17/30* (2006.01)
(52) U.S. Cl. ................. 707/104.1; 707/102; 715/500.1
(58) Field of Classification Search ............. 707/104.1, 707/102, 500.1, 501.1
See application file for complete search history.

(56) References Cited

U.S. PATENT DOCUMENTS

| | | | |
|---|---|---|---|
| 5,418,586 A | | 5/1995 | Fujimori et al. |
| 5,440,677 A | * | 8/1995 | Case et al. ................ 715/500.1 |
| 5,548,751 A | * | 8/1996 | Ryu et al. .................... 707/102 |
| 5,651,599 A | | 7/1997 | Fujimori et al. |
| 5,956,729 A | * | 9/1999 | Goetz et al. ............. 707/104.1 |
| 5,988,818 A | | 11/1999 | Fujimori et al. |
| 6,144,375 A | * | 11/2000 | Jain et al. ................ 715/500.1 |
| 6,742,176 B1 | * | 5/2004 | Million et al. ............... 717/120 |
| 2002/0193895 A1 | * | 12/2002 | Qian et al. ..................... 700/94 |

FOREIGN PATENT DOCUMENTS

| | | |
|---|---|---|
| JP | 5101118 | 9/1991 |
| JP | 6139324 | 10/1992 |
| JP | 6139324 | 3/1994 |
| JP | 11262744 | 3/1998 |

* cited by examiner

*Primary Examiner*—Frantz Coby
*Assistant Examiner*—CamLinh Nguyen
(74) *Attorney, Agent, or Firm*—Volpe and Koenig, P.C.

(57) ABSTRACT

A method for combining multimedia files according to the present invention includes a step of selecting a plurality of files of the same kinds or different kinds, a step of checking the structures of the selected files, and a step of combining the selected files based on their structures. Various useful information for users can also be added to the combined files to provide the users better service. The present invention can be implemented in an on-line system as well as an off-line system.

4 Claims, 6 Drawing Sheets

FIG. 4

First File (a)

| 4 Byte Header | Header of the First Frame | First Frame | Header of the Second Frame | Second Frame | ... | Header of the First $N^{th}$ Frame | $N^{th}$ Frame |

Second File

| 4 Byte Header | Header of the First Frame | First Frame | Header of the Second Frame | Second Frame | ... | Header of the First $N^{th}$ Frame | $N^{th}$ Frame |

(b)

| 4 Byte Header ||||| 
|---|---|---|---|---|
| Total Number of Frames | Size of the File | Date of the File | Type of the File | Attribute of the File |

(c)

| 4 Byte Header | Header of the First Frame | First Frame | Header of the Second Frame | Second Frame | ... | Header of the First $N^{th}$ Frame | $N^{th}$ Frame |

| Header of the $N+1^{th}$ Frame | $N+1^{th}$ Frame | Header of the $N+2^{th}$ Frame | $N+2^{th}$ Frame | ... | Header of the $2N^{th}$ Frame | $2N^{th}$ Frame |

FIG. 5
(a)
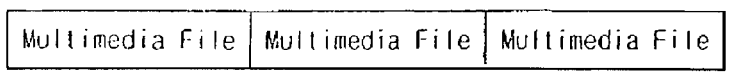
(b)
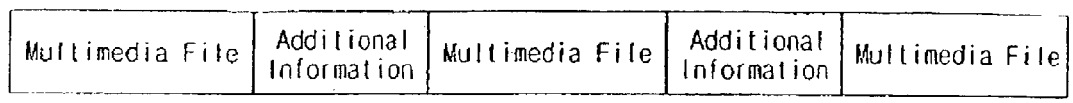
(c)
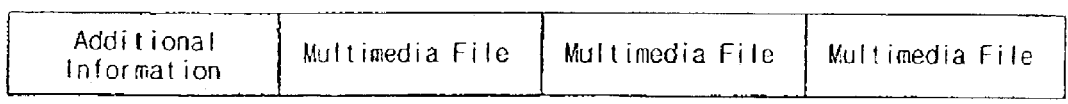
(d)
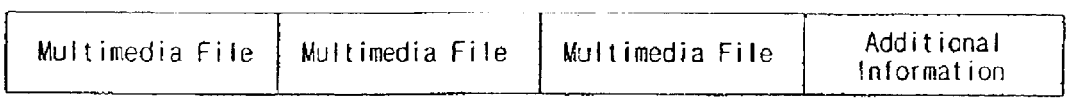
(e)
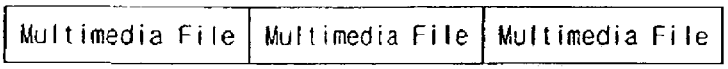
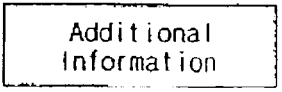

METHOD OF COMBINING MULTIMEDIA FILES

TECHNICAL FIELD

The present invention relates to a method for combining multimedia files, and in particular, to a method for combining a plurality of files of the same kind or of different kinds to provide services of multiple and different kinds and to provide additional information for multimedia file users by adding additional information to the combined multimedia files.

BACKGROUND ART

The recent development of digital technology promoted development of multimedia players for reproducing digitalized music and image files rather than analog data recorded on magnetic recording media. Owing to the advantages of infinite copying and free compilation of digital files, the applicable scope of those multimedia players is becoming wider.

With the development of networking technology along with the development of computer technology, the digital multimedia files are downloadable on a network and implementable in a multimedia player. Thus, multimedia players have become convenient in their use. Moreover, since the digital data are compressible, a large amount of data can be stored in a medium of small capacity.

To realize music or images through a multimedia player, digital files need to be reproduced in accordance with the international protocol or standards. No problems arise in reproduction when combining files of the same kind in accordance with the international protocol or standards. When physically combining files of different kinds, however, computer programs are crashed out during reproduction. Also, it is impossible to provide new services by combining files or improved services by adding additional information.

DISCLOSURE OF INVENTION

It is, therefore, an object of the present invention to provide a method for combining multimedia files that enables provision of services of multiple and different kinds by combining files of the same or different kinds.

It is another object of the present invention to provide a method for combining multimedia files that enables provision of additional information for the user including the information on the files being reproduced by adding additional information to the multimedia file being combined.

To achieve the above objects, there is provided a method for combining multimedia files, comprising the steps of selecting a plurality of multimedia files to be combined of the same kind or different kinds; recognizing the selected plurality of files of the same kind or different kinds by grasping the structures of the files in accordance with the recognition of international protocol; combining the selected plurality of multimedia files; and generating a new multimedia file by adding additional information to the combined media file.

The step of combining the multimedia files of the same kind comprises the sub-steps of renewing a header of the first multimedia file so as to include information on a file to be generated as a result of combination; removing each header of the multimedia files except the one of the first multimedia file; combining the first multimedia file with the multimedia files having no header except the first multimedia file; and revising the header of the first multimedia file to conform to the international protocol.

When combining the files of different kinds, the original contents of the first multimedia file and the second multimedia file are combined per se without any physical modification. When reproducing the files, the different reproducing methods should be adopted depending on the kinds of the files by adding the information on kinds and sizes of the first and second files to the combined file. The reproducing time is calculated according to the sizes of the original files.

Another characteristic of the present invention lies in providing diverse information related to the file being reproduced, while the conventional method for combining files simply comprises a step of adding files.

In general, the music and image multimedia files have a variety of formats such as mp3, mp4, dat, avi, ra, rm, mid, sgf, mov, mpg, vob, wav, rjs, dvd, ram, wma, asf, etc. All the files of diverse formats have protocols related to each file. Generation and reproduction of files are performed according to the protocols. In the present invention, new files are generated by combining files of different formats or additional information is added to the generated files. Particularly when combining files of different kinds, the combined new file includes additional information on the format of each file so as to recognize the respective format. Thus, files can be reproduced according to the protocol corresponding to the files of each format.

BRIEF DESCRIPTION OF DRAWINGS

The above and other objects, features and advantages of the present invention will become more apparent from the following detailed description when taken in conjunction with the accompanying drawings, in which:

FIG. 4(a) is a diagram illustrating a structure of multimedia files to be combined;

FIG. 4(b) is a diagram illustrating a header of a file in FIG. 4(a);

FIG. 4(c) is a diagram illustrating a file combined according to the present invention;

FIG. 5 is a diagram illustrating types of adding additional information to the files combined according to the present invention;

BEST MODE FOR CARRYING OUT THE INVENTION

Best modes for carrying out the present invention will be described herein below with reference to the accompanying drawings. In the following description, well-known functions or constructions are not described in detail since they would obscure the invention in unnecessary detail.

Figure 1:
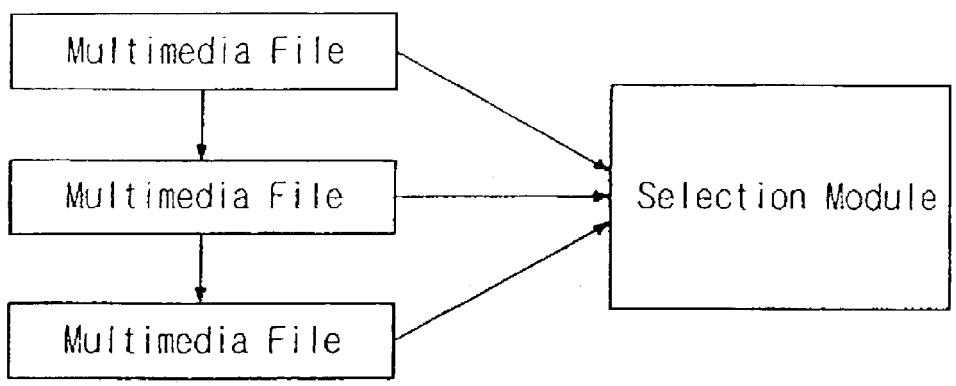
FIG. 1 is a block diagram illustrating a process of selecting files according to the present invention.

FIG. 1 is a block diagram illustrating a process of selecting files according to the present invention. Referring to FIG. 1, a user should select files to be combined among a plurality of files by means of a selection module. This step is identical to the file selecting process in the ordinary file treating process. To be specific, the present invention provides a user with a dialog box by means of a computer monitor, and enables the user to search and select two or more files. The files to be combined may be in arbitrary formats such as mp3, mp4, dat, avi, ra, rm, mid, sgf, mov, mpg, vob, wav, rjs, dvd, ram, wma, asf, etc., and they need not have the same format.

Figure 2:
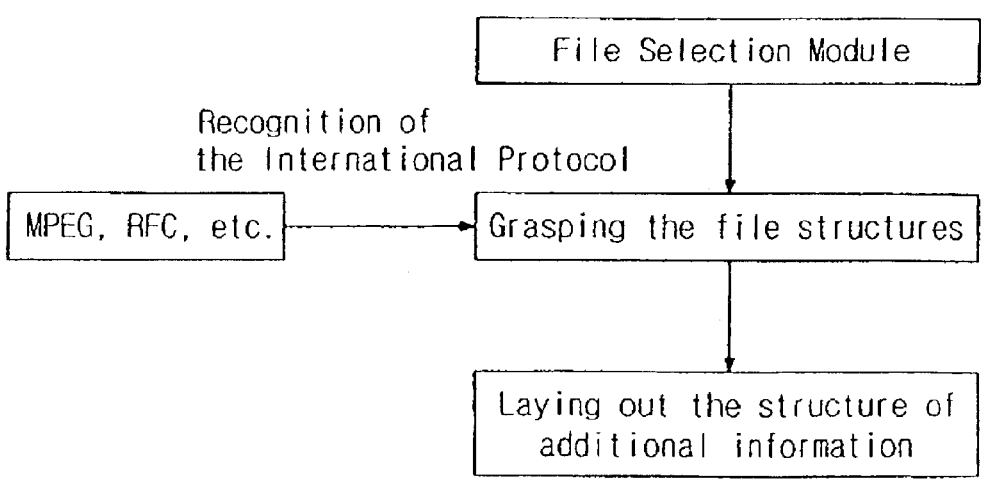
FIG. 2 is a block diagram illustrating a process of recognizing files according to the present invention.

The multimedia files selected by means of a selection module undergo the recognizing process as shown in FIG. 2. For example, when a multimedia file such as MP3 has been selected, the structure of the file can be grasped by recognizing an internationally publicized protocol such as RFC (internet request for comments) or MPEG (moving picture experts group). Files can be combined or additional information can be added based on such a file structure.

The format of the selected multimedia file can be determined by reading headers of the file. For example, the multimedia file such as MP3 is composed of a 4 byte header, N number of frame headers and N number of frames. The multimedia file of a 4 byte header includes diverse information on the file including the total number of frames, size of the file, file creation date, format and attribute of the file. A format of the file is determined by reading the header.

The process of combining files will now be described in detail. The process of combining files is a process of opening files and incorporating the information contained therein without any physical modification thereof.

Figure 3:
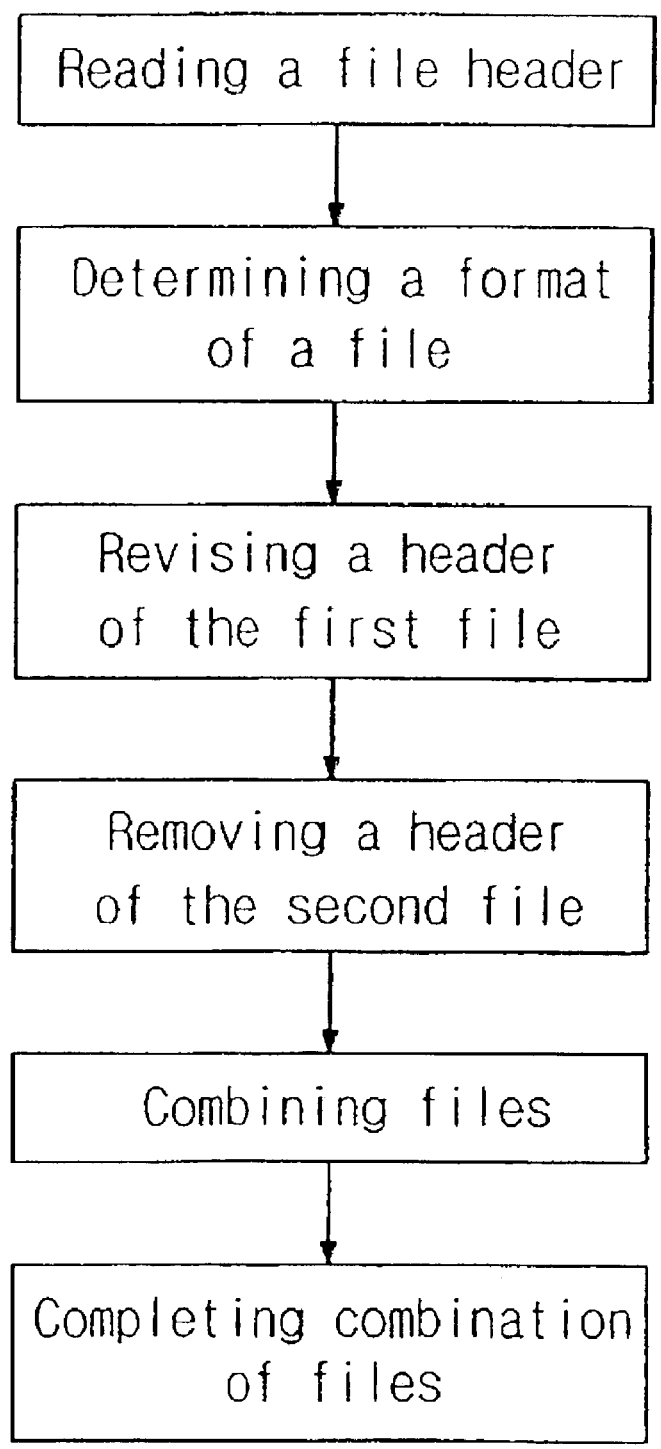
FIG. 3 is a flow chart illustrating a process of combining a plurality of files of the same kind according to the present invention.

FIG. 3 is a flow chart illustrating a process of combining a plurality of files of the same kind according to the present invention.

Referring the FIG. 3, the header of the first file is renewed so as to include the information on the second file to be combined therewith. The header of the second file is then removed. A new multimedia file is produced by combining the second file with the first file. FIG. 4(c) shows the combined file. As shown in FIG. 4(c), when two files are combined, for example, the header is renewed so that the information contained in the header of the first file may include entire information on the combined file, even after the header of the second file is removed.

The header of the combined multimedia file may be revised to conform to the international protocol such as RFC or MPEG. In other words, if the file initializing part includes a portion designating the size of the entire file, the size of the entire file is equivalent to a summed-up size of the original files. Thus, the header of the newly generated file needs to be revised. Since such a revision is subject to the international protocol, any multimedia files not bound by the international protocol may be generated without a revision.

Although the file combining process shown in FIG. 3 is a process of combining two files only, the present invention is not limited to a process of combining files of a particular number but is applicable to combining files of three or more files.

A process of combining files of different kinds will now be described in detail.

When combining a first multimedia file with a second multimedia file of different kinds, the original files are combined per se without any physical medication. At this stage, the information including the kinds and sizes of the first and the second files is added to the combined file. Since the first and the second files have different formats, the reproducing methods thereof are also different. The information on the reproducing method of each file can be obtained from the information added to the combined file. The reproducing time of the combined file can also be obtained from the information added to the combined file.

For instance, when files of different kinds such as a music file and an image file are combined, sound and image can be simultaneously reproduced based on the information contained in the combined file.

The above description pertains to a process of selecting files to be combined, recognizing the formats of the selected files, and combining the plurality of selected files. Additional information can be added to the combined file. Information annexable to the combined file includes a serial number, times to be reproduced, times reproduced, date first reproduced, type of the song reproduced as well as a number, sex, nationality, debut year of the singer and published year of the song. Such additional information may be variable in kind and contents depending on the format of the file, and renewable whenever necessary by forming a reservation region for future services in the additional information.

Figures 6, 7:
FIG. 6 is a diagram exemplifying additional information added to the files combined according to the present invention.
FIG. 7 is a diagram illustrating a construction of a file combining system operated on line according to the present invention.

FIG. 6 is a diagram exemplifying additional information added to the files combined according to the present invention. Better services can be provided for a user with the additional information when a file is reproduced.

Meanwhile, the multimedia file containing additional information can be classified into a number of kinds. The combined multimedia file shown in FIG. 5(b) represents a format of adding additional information between the multimedia files. FIGS. 5(c) and (d) show a format, in which additional information is added to the front and rear ends of the combined multimedia file. Also, as shown in FIG. 5(e), an additional information file may be formed in a separate manner.

Figure 8:
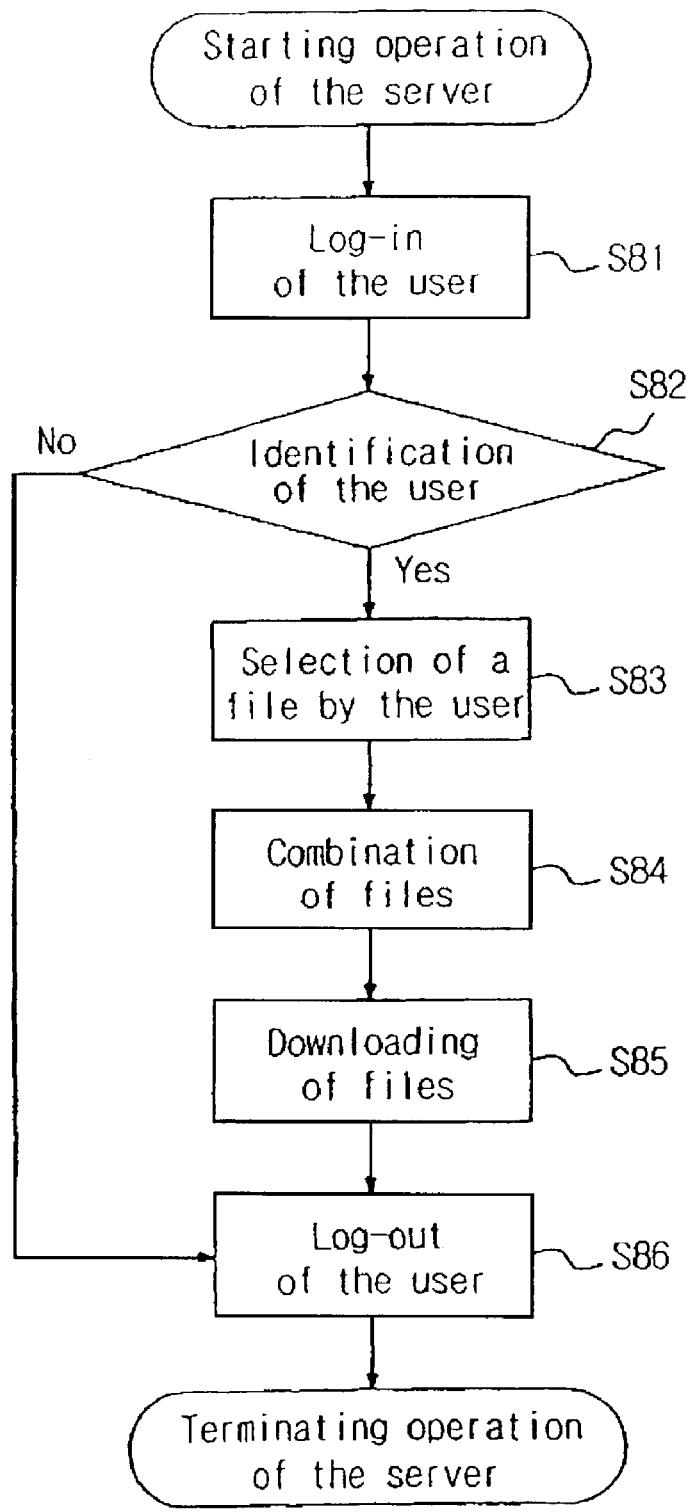
FIG. 8 is flow chart illustrating a file combining process performed on line according to the present invention.

According to another best mode for carrying out the present invention as shown in FIG. 7, the user selects files to be combined on line, a web server combines the files and provides the user with the combined files on line, as shown in FIG. 8.

As show in FIG. 8, the user inputs his/her own ID and a password to log in (S81). The user's computer transmits the inputted user ID and the password to a web server, which in turn authenticates the user (S82).

Upon completion of the user authentication, the web server transmits a web page, which is competent to select files to be combined, to the user's computer.

The user selects the files to be used (S83), and the web server combines the files selected by the user as well as the file read in by the server itself The files to be combined may be composed of the files selected by the user or of the files selected by the user and the files selected by the server.

Once the file combination is completed, the user can download the combined file (S86).

As described above, the present invention provides the user not only with different kinds of services (e.g., music and images) by generating a new multimedia file through combination of multimedia files of the same kind or different kinds to reproduce a plurality of files having different formats, but also with useful additional information added to the combined file, thereby enhancing the quality of services.

While the invention has been shown and described with reference to best modes thereof, it will be understood by those skilled in the art that various changes in form and details may be made therein without departing from the spirit and scope of the invention as defined by the appended claims.

The invention claimed is:

1. A computer-implemented method for combining multimedia files, comprising wherein the computer-implemented method comprises the steps of:
   selecting a plurality of multimedia files of the same kind or different kinds to be combined;
   grasping structures of each of the selected multimedia files; and
   combining the selected plurality of multimedia files based on the grasped structures of the files;
   wherein the step of combining the multimedia files comprises the following sub-steps, if the multimedia files are of the same kind:
      renewing a header of the first multimedia file so as to include information on a file to be generated as a result of combination;
      removing each header of the multimedia files except the first multimedia file;
      combining the first multimedia file with the remaining multimedia files, the headers of which have been removed; and
      revising the header of the first multimedia file to conform to a predefined protocol,
   wherein the step of combining the multimedia files comprises the following sub-steps, if the multimedia files to be combined are of different kinds:
      combining the multimedia files and adding information on each of the multimedia files to the combined file.

2. The method for combining multimedia files of claim 1, further comprising a step of adding additional information to the combined file.

3. The method for combining multimedia files of claim 2, wherein the additional information includes a serial number, times to be reproduced, times reproduced, date first reproduced, type of the song reproduced as well as a number, sex, nationality, debut year of the singer and published year of the song.

4. The method for combining multimedia files of claim 1, wherein the selection of files is performed by a user on line, and the combined files are provided on line for the user.

* * * * *